2,752,343

ISOMERIZATION OF DIAMINOBUTYNES

Marian F. Fegley, Mont Clare, and Newman M. Bortnick, Oreland, Pa., assignors to Rohm & Haas Company, Philadelphia, Pa., a corporation of Delaware No Drawing. Application October 23, 1952,
Serial No. 316,558

9 Claims. (Cl. 260—240)

This invention relates to a method for converting 1,4-diamino-2-butynes into isomeric 1,4-diamino-1,3-butadienes and to some of the novel 1,4-diaminobutadienes resulting thereby.

The thermal isomerization of 1,4-bis(dimethylamino)-2-butyne and of 1,4-bis(diethylamino)-2-butyne to corresponding butadienes has been found to take place at high temperatures on active catalysts, such as chromium oxide. This method is, however, not applicable to higher or larger bisaminobutynes. In contrast to this thermal method the present process can be applied not only to 1,4-bis(dimethylamino)-2-butyne and 1,4-bis(diethylamino)-2-butyne, but also to similar butynes having larger N-substituents, to diaminobutynes having nitrogen in a heterocycle, and to diaminobutynes having hydrocarbon substituents in the 1- and/or 4-positions.

The diaminobutynes which have been investigated as starting materials for isomerization may be represented by the structural formula

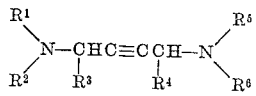

wherein $R^1$, $R^2$, $R^5$, and $R^6$ taken individually represent hydrocarbon groups including alkyl, alkenyl, aryl, aralkyl, or cycloalkyl groups, $R^1$ and $R^2$ when taken together represent a divalent chain which forms a heterocycle with the nitrogen, $R^5$ and $R^6$ when taken together may likewise represent a divalent chain forming a heterocycle with nitrogen, and $R^3$ and $R^4$ represent hydrogen, or hydrocarbon groups including alkyl groups, alkenyl groups, aralkyl groups, cycloalkyl groups, and aryl groups.

Our process for isomerizing 1,4-diamino-2-butynes to 1,4-diamino-1,3-butadienes comprises treating a said butyne with an alkali metal catalyst as defined below at temperatures from about 0° to 250° C., the range of 20° to 150° C. being preferred. The reaction is conveniently carried out in the presence of an inert organic solvent, such as a naphtha, benzene, toluene, xylene, dioxane, isopropyl ether, and the like. The reaction mixture is then stripped of solvent and the butadiene formed is usually distilled under reduced pressure. Some butadienes can be separated by crystallization.

As catalysts there are used sodium metal or lithium metal in finely divided form, or sodium hydrocarbons, including alkyl sodium, aralkyl sodium, aryl sodium, and alkenyl sodium, for most effective action. Sodamide gives some conversion of diaminobutynes to diaminobutadienes, but it also causes in high proportion formation of dimeric products. Dispersions of potassium metal promote in major proportion formation of dimeric products, although providing some formation of aminobutadienes. Allyl sodium, amyl sodium, cyclohexyl sodium, benzyl sodium, phenyl sodium, furyl sodium, and similar sodium hydrocarbons and sodium compounds having sodium attached to carbon promote the reaction to the butadienes. The lower alkali metals are best used in the form of dispersions, sodium dispersions being readily prepared, for example, in naphtha, toluene, xylene, dioxane, or other inert solvent. Yet even with good dispersions rate of isomerization rapidly decreases as the size of substituent groups increases in the diaminobutynes. A satisfactory rate is obtained, however, in the case of these compounds by taking up the dispersion first in a small amount of a lower diaminobutyne. Bis(dimethylamino)-2-butyne is most useful for this purpose. The sodium hydrocarbons are soluble in the larger butynes and are very effective isomerizing catalysts with such aminobutynes of large molecular size.

Proportions of the diaminobutyne to be isomerized to catalyst have been used in mole ratios from 5:1 to 100:1. The best proportions are from 20:1 to 50:1. Catalyst may be added from time to time as reaction proceeds.

The isomerization reaction in many cases can be initiated at room temperature. With slow addition of a diaminobutyne to a dispersion of sodium or lithium in a solvent the reaction can often be started without external heating. Since, however, there is apt to be an induction period, a rather violent reaction may then take place. It is better to heat catalyst dispersion to 40° to 90° C. and add diaminobutyne to it. The reaction then proceeds smoothly.

The diaminobutynes are prepared by condensing together two moles of secondary amine and an aldehyde and one mole of acetylene in the presence of a heavy metal of the first or second groups of the periodic table. In particular copper and its salts such as cuprous chloride, copper acetate, or copper formate are effective in promoting the condensation. Temperatures up to 120° C. may be used. Details of a method are given in U. S. Patent 2,273,141, issued February 17, 1942, and while this method is directed primarily to making propargylamines, adjustment of mole ratios gives the butynes principally. Furthermore, a propargylamine may be prepared from one secondary amine, an aldehyde, and acetylene and the thus produced monoamine is reacted with an aldehyde, which may be the same as or different from that first used, and with a secondary amine which may be the same as or different from that used in the first step. Thus, the diaminobutynes may be symmetrical or unsymmetrical.

As useful secondary amines for preparing the diaminobutynes there may be used dialkylamines such as dimethylamine, diethylamine, dipropylamine, dibutylamine, diamylamine, dihexylamine, diheptylamine, dioctylamine, dinonylamine, methylbutylamine, methyloctylamine, methyl isononylamine, methyldodecylamine, etc. It is preferred that the total number of carbon atoms in $R^1$ and $R^2$ or $R^5$ and $R^6$ does not exceed about 18. These groups may be cycloaliphatic as supplied by dicyclohexylamine, dicyclopentylamine, or cyclohexylmethylamine, or aralkyl as from dibenzylamine or from N-methyl-N-benzylamine, or unsaturated aliphatic hydrocarbon groups such as allyl, methallyl, crotyl or undecentyl, or aryl such as phenyl, alkylphenyl, or naphthyl.

The secondary amine may be heterocyclic. In this case $R^1$ and $R^2$ together or $R^5$ and $R^6$ together form a divalent chain, such as

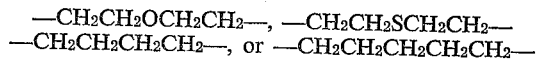

as found in morpholine, thiamorpholine, pyrrolidine, and piperidine, respectively, or in similar heterocyclic amines.

When formaldehyde is used as the aldehyde, the terms $R^3$ and $R^4$ appear as hydrogen. With other aldehydes these groups appear as hydrocarbon groups or their equivalents. Such aldehydes include acetaldehyde, propionaldehyde, butyraldehyde, isobutyraldehyde, heptaldehyde, nonylaldehyde, dodecylaldehyde, benzaldehyde, alkylbenzaldehydes, tetrahydrobenzaldehyde, hexahydrobenzaldehyde, β-phenylpropionaldehyde, 2-ethyl-3-propylacrolein, etc. It is preferred that the groups $R^3$ and $R^4$ supplied by the aldehydes contain not over eleven carbon atoms each.

Typical diaminobutynes are 1,4-bis(dimethylamino)-2-butyne, 1,4-bis(diethylamino)-2-butyne, 1,4-bis(di-n-butylamino)-2-butyne, 1,4-bis(N-methyl-N-octylamino)-2-butyne, 1,4-dimorpholino-2-butyne, 1,4-dipiperidino-2-butyne, 1,4-dipyrrolidino-2-butyne, 1-dimethylamino-4-morpholino-2-butyne, 1-dimethylamino-4-piperidino-2-butyne, 1,4-bis(diallylamino)-2-butyne, 1,4-bis(N-methyl-N-phenylamino) - 2 - butyne, 1,4-bis(dicyclohexylamino)-2-butyne, 1 - methyl-1-morpholino-4-dimethylamino-2-butyne, 1,4-diisopropyl-1, 4-bis(dimethylamino)-2-butyne, 1-phenyl - 1 - morpholino - 4 - dimethylamino - 2 - butyne, 1,4-diphenyl-1, 4-bis(dimethylamino)-2-butyne, 1,4-bis(dimethylamino) - 1, 4 - di(2,4,4-trimethylpentyl)-2-butyne, 1,4-bis(diethylamino)-1,4-diisopropyl-2-butyne, etc.

Details of isomerizing diaminobutynes to diaminobutadienes are shown in the following illustrative examples. Parts are by weight.

*Example 1*

A reaction vessel equipped with stirrer, dropping funnel, water-cooled condenser, and thermometer was charged with 121 parts of naphtha and 4.5 parts of sodium dispersion in toluene. The charge was heated to 63° C. by means of an oil bath. There was then slowly added 1,4 - bis(dimethylamino) - 2 - butyne, the temperature being between 60° and 80° C. After addition of 342 parts of this butyne the reaction mixture was heated under reflux for two hours. Solvents were then stripped off and the product distilled. The following fractions were taken: at 100°–109° C./20 mm. 145 parts having a refractive index of 1.5475, consisting of 96% pure 1,4-bis(dimethylamino)-1,3-butadiene; at 112° C./27 mm. 57 parts having a refractive index of 1.547 and containing 95–96% of the same substance; at 53°–59° C./0.1–0.13 mm. 108.5 parts of a product having a refractive index of 1.5475 and containing 95.7% by analysis of the same butadiene; and at 63°–73° C./1.1–0.65 mm. 15 parts having a refractive index of 1.5492 and having a purity of 97.2% of the same butadiene. These four fractions together represented a conversion of 89%. The distillates contained 3.2% of unchanged 1,4-bis(dimethylamino)-2-butyne.

This compound is useful as a corrosion inhibitor and stabilizer.

While the above method can be applied to diaminobutynes having N-substituents of one to four carbon atoms with success, the rate of reaction becomes markedly less as the size of N-substituent increases. With still larger hydrocarbon substituents the rate becomes too slow for practical use. This behavior results apparently from decreasing solubility of catalyst as the reactant increases in molecular size. It was found, however, that when the sodium dispersion was taken up in 1,4-bis(dimethylamino)-2-butyne and this mixture was used with large diaminobutynes, the isomerization reaction proceeded at a practical rate with a favorable degree of conversion. A favorable rate and good conversion are also obtained with an alkyl sodium or an aryl sodium or the like.

*Example 2*

In accordance with the above teaching there was charged to a reaction vessel equipped as above 50 parts of naphtha and 4 parts of a 50% sodium dispersion in xylene. The charge was heated to over 40° C. and 14 parts of 1,4-bis(dimethylamino)-2-butyne was slowly added. Then there was slowly added 6,9-bis(dimethylamino)-2,2,4,11,-13,13-hexamethyl-7-tetradecyne to a total of 136 parts. The temperature of the reaction mixture was held at 60–70° C. during the 40 minutes taken to complete the addition of the reactant. The temperature was then held at 70° up to 80° C. for about 2.5 hours. Solvent was then distilled off. At 68°–132° C./2.8–5 mm. there was taken a fraction of 10 parts which was 1,4-bis(dimethylamino)-1,3-butadiene. At 187°–192° C./4.4–3.2 mm. a fraction of 131 parts was taken. This was by analysis 98% pure material of the formula

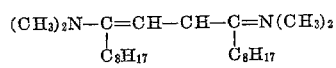

where the $C_8H_{17}$ groups are 2,4,4-trimethylpentyl groups. This product has a refractive index, $n_D^{20}$, of 1.4986.

*Example 3*

The reaction vessel was charged with 163 parts of dioxane and 112 parts of 1,4-dimorpholino-2-butyne. This mixture was stirred and heated to dissolve the butyne. It was cooled to about 30° C. and thereupon 10 parts of a 50% sodium dispersion in dioxane were added. An exothermic reaction began and carried the temperature of the mixture to 54° C. Thereupon an oil bath at 86° C. was applied to the reaction vessel and the temperature of the reaction mixture rose to 93° C. The mixture was stirred for 20 hours with the temperature at 83° C. Most of the dioxane was stirred off under reduced pressure. The residue was taken up in toluene and treated with decolorizing charcoals and filtered while hot. From the filtrate a solid separated. It was by analysis 1,4-dimorpholino-1,3-butadiene. Several crops of crystals were separated. They melted at 138.5°–139.5° C.

In the same way there may be reacted butynes having other heterocyclic amino substituents. Thus, 1,4-dipiperidino-2-butyne yields 1,4-dipiperidino-1,3-butadiene and 1,4-dithiamorpholino-2-butyne yields 1,4-dithiamorpholino-1,3-butadiene.

*Example 4*

A reaction vessel equipped with a stirrer, dropping funnel, and water-cooled condenser which carried a drying tube was charged with about 5 parts of a 40% sodium dispersion in toluene and 40 parts of naphtha. This mixture was stirred and heated to 70° C. Thereto was slowly added 1,4-dipyrrolidino-2-butyne to a total of 40 parts while the resulting mixture was heated. When the addition was complete, the mixture was stirred and maintained with an oil bath at 100° C. for an hour. The reaction mixture was fractionally distilled. The material taken at 115° C./0.35 mm. and 118° C./0.9 mm. was 1,4-dipyrrolidino-1,3-butadiene. The refractive index at 20° C. is 1.5988.

The compounds having heterocyclic amine groups form a class of considerable interest. The initial butyne may be represented conveniently by the formula

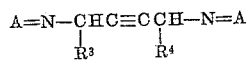

where A represents a divalent chain forming a heterocycle with the nitrogen and $R^3$ and $R^4$ represent hydrogen or hydrocarbon groups. When these compounds are treated with an alkali metal catalyst for isomerization, they are converted to aminobutadienes of the formula

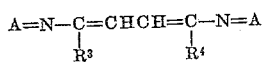

It should also be pointed out that mixed aminobutynes and corresponding butadienes may be made in which only one amine group is heterocyclic.

*Example 5*

To a mixture of 40 parts of naphtha and 0.65 part of lithium metal cut into small pieces there was slowly added 102 parts of 1,4-bis(dimethylamino)-2-butyne. There was an initial rise of temperature. The vessel was then heated for an hour with the oil bath at 60° and for 1.5 hours at 95° C. Fractions were taken at 47°–54° C./<1 mm. and 56°–107° C./<1 mm. The first was 93% pure 1,4-bis-(dimethylamino)-1,3-butadiene and the second was the same material in a purity of 95%. The conversion was 70%.

Example 6

1,4-bis(dibutylamino)-2-butyne was treated in xylene solution with a dispersion of sodium in xylene as in Example 2. The product was distilled at 142° C./0.35 mm. It contained by analysis 9.1% of nitrogen (theory 9.07%) and had a refractive index, $n_D^{20}$, of 1.5020. By ultraviolet analysis the distillate was 92% pure 1,4-bis(dibutylamino)-1,3-butadiene.

Example 7-A

From 1,4-bis(diethylamino)-2-butyne treated with a sodium dispersion as in Example 1 there was obtained 1,4-bis(diethylamino)-1,3-butadiene. This product distilled at 64° C./0.25 mm. and had a refractive index of 1.5155.

Example 7-B

From 1,4-bis(dimethylamino)-1,4-diisopropyl-2-butyne there was prepared by a method essentially that of Example 2 1,4-bis(dimethylamino)-1,4-diisopropyl-1,3-butadiene. This product distilled at 68°–75° C./0.2 mm. and had a refractive index of 1.4948.

The initial butyne was prepared from dimethylamine, isobutyraldehyde, and acetylene with cuprous chloride as catalyst. It distilled at 67°–70° C./0.3 mm. and had a refractive index at 20° C. of 1.4550.

Example 8

From morpholine, acetaldehyde, and acetylene there was prepared by the method described in United States Patent 2,273,141

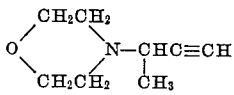

This acetylene derivative was then reacted with formaldehyde and dimethylamine in the presence of cuprous chloride to give 4-morpholino-1-dimethylamino-2-pentyne. This distilled at 112°–114° C./1 mm. and had a refractive index of 1.4828.

This product was treated in naphtha solution with sodium dispersion in toluene in a ratio of 11 grams of sodium per gram mole at 74° C. for 2.7 hours. The resulting butadiene distilled at 110°–115° C./0.3 mm. and had a refractive index of 1.5625 at 20° C. It has the structure

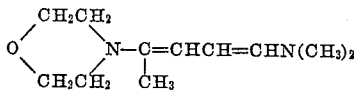

A similar product was made from 1-morpholino-1-phenyl-4-dimethylamino-2-butyne, the butyne group isomerizing to the 1,3-butadiene group. This compound distills at 150°–160° C./0.5 mm. and has the structure

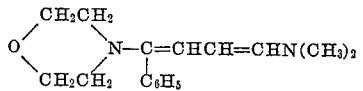

Example 9

Sodium dispersion added to 1,4-bis(dimethylamino)-2-butyne was mixed with a xylene solution of 1,4-bis(dimethylamino) - 1,4 - diphenyl - 2 - butyne (from dimethylamine, benzaldehyde, and acetylene). The reaction mixture was heated at 70° C. for two hours. The product was 1,4 - bis(dimethylamino)-1,4-diphenyl-1,3-butadiene, having a refractive index of 1.593 and distilling at 169°– 174° C./0.15 mm. This product became crystalline upon standing.

Example 10

Phenyl sodium was prepared in toluene by the method of Hansley (Ind. Eng. Chem. 43, 1759 (1951)). To five parts of phenyl sodium in 20 parts of toluene and 30 parts of a naphtha heated to 55° C. addition was made of 100 parts of 1,4-bis(dimethylamino)-2-butyne over a period of 50 minutes. An exothermic reaction took place and was controlled by the refluxing of the naphtha. After the addition was complete, the mixture was heated under reflux for an hour. The mixture was then distilled. After removal of solvents there was collected under reduced pressure 1,4-bis(dimethylamino)-1,3-butadiene in a conversion of 85%. Some of the starting material was recovered and the yield on material used was 94%.

Example 11

Benzyl sodium was prepared in toluene by the method described by Hansley. There were mixed 10 parts of benzyl sodium in 20 parts of toluene and 30 parts of naphtha and thereto was added 3,6-bis(dimethylamino)-2,7-dimethyl-4-octyne over a 30 minute period, while the temperature was maintained at 60°–90° C. The reaction mixture was heated under reflux for two hours and then distilled. The product was 3,6-bis(dimethylamino)-2,7-dimethyl-3,5-octadiene and the conversion was 65%.

The use of phenyl sodium, benzyl sodium, allyl sodium, amyl sodium or the like is advantageous when bis(amino)-butynes of large molecular size are used as starting materials.

When 1,4-bis(dimethylamino)-2-butyne was treated with potassium in toluene and heated to 115° C. for 1.5 hours, products were obtained from which fractions were distilled. The first fraction taken at 45°–48° C./<1 mm. contained 19% of 1,4-bis(dimethylamino)-1,3-butadiene, as determined by ultraviolet absorption analysis. There was an 18.5% conversion to the diaminobutadiene and an 11% conversion to dimeric products during the above period of reaction.

With sodamide as a catalyst there was 65% conversion to dimeric products and 12% conversion to bis(dimethylamino)-1,3-butadiene.

The process of this invention comprises treating a diaminobutyne of the formula

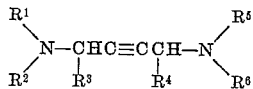

with an alkali metal catalyst such as lithium metal, sodium metal, or a sodium hydrocarbon, between 20° and 125° C. and preferably 40° to 90° C. and separating butadienes of the formula

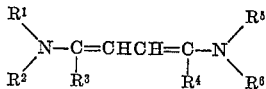

wherein $R^1$, $R^2$, $R^5$, and $R^6$ taken individually represent hydrocarbon groups, $R^1$ and $R^2$ when taken together represent a divalent chain which forms a heterocycle with the nitrogen, such as

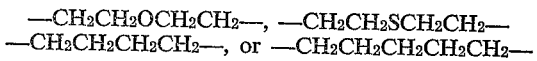

$R^5$ and $R^6$ when taken together may likewise represent a similar divalent chain, and $R^3$ and $R^4$ represent hydrogen or hydrocarbon groups.

It has been found that diaminobutadienes may be transaminated to other diaminobutadienes. It is most convenient to start with a diaminobutadiene which yields a readily volatile secondary amine, such as dimethylamine or diethylamine and to introduce a larger secondary amino group. Thus, for example, 1,4-bis(dimethylamino)-1,3-butadiene is reacted under nitrogen with morpholine with evolution of dimethylamine to give a form of bis(morpholino)-1,3-butadiene which melts at 62°–65° C. When this product is heated and is recrystallized from ether, the pure single isomer is formed, melting at 139°–140° C.

The diaminobutadienes are highly reactive chemical intermediates. They react with alcohols and mercaptans to give new substances useful in such fields as insecticides, fungicides, wetting agents, and pharmaceuticals. They react with hydrogen cyanide to give dinitriles, from which in turn there may be prepared polyamines, amides, acids, salts, esters, and the like. They react with some vinylidene compounds by addition to form new cyclic products. For example, the 1,4-diamino-1,3-butadienes react with acrylonitrile to form 1,4-diamino-3-cyano-1,2,3,4-tetrahydrobenzenes, a new class of valuable products and intermediates.

The process of this invention makes available the two relatively simple bis(dialkylamino)-1,3-butadienes which have been previously prepared, and also similar butadienes of larger molecular weight and, of particular interest and importance, compounds of similar over-all structure in which the amino groups are parts of heterocycles and those in which hydrocarbon substituents occur on the 1- and 4- carbon atoms of the butadiene group. Also, the process makes available diamino-1,3-butadienes which are unsymmetrical in structure. These various types of new compounds are especially valuable as intermediates. The compounds having amino nitrogen in heterocyclic groups possess some unusually interesting properties. They have greater stability than the simple diaminobutadienes and yield derivatives which also have good stability. In particular the heterocyclic-containing butadienes are not sensitive to acid.

We claim:

1. A process for preparing compounds of the structure

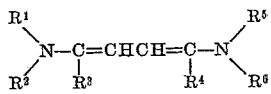

which comprises isomerizing compounds of the structure

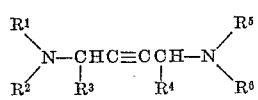

by treating them between 0° and 250° C. in the presence of an inert organic solvent with a member of the class consisting of lithium metal, sodium metal, and sodium hydrocarbon, $R^1$, $R^2$, $R^5$, and $R^6$ taken individually representing hydrocarbon groups, $R^1$ and $R^2$ when taken together and $R^5$ and $R^6$ when taken together representing divalent chains from the class consisting of —CH2CH2OCH2CH2—, —CH2CH2SCH2CH2—
—CH2CH2CH2CH2—, and —CH2CH2CH2CH2CH2— and $R^3$ and $R^4$ representing a member of the class consisting of hydrogen and hydrocarbon groups, alkyl groups of not over 11 carbon atoms, and the phenyl group.

2. A process for preparing compounds of the structure

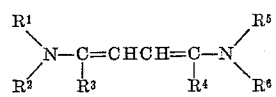

which comprises isomerizing compounds of the formula

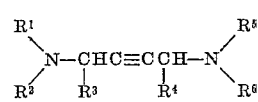

by treating them between 0° and 250° C. with a dispersion of sodium metal in an inert organic solvent, $R^1$, $R^2$, $R^5$, and $R^6$ taken individually representing hydrocarbon groups, $R^1$ and $R^2$ when taken together and $R^5$ and $R^6$ when taken together representing divalent chains from the class consisting of —CH2CH2OCH2CH2—, —CH2CH2SCH2CH2—
—CH2CH2CH2CH2—, and —CH2CH2CH2CH2CH2— and $R^3$ and $R^4$ representing a member of the class consisting of hydrogen and hydrocarbon groups, alkyl groups of not over 11 carbon atoms, and the phenyl group.

3. A process for preparing compounds of the structure

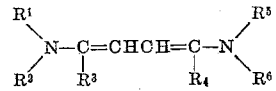

which comprises isomerizing diaminobutynes of the formula

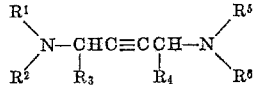

by treating them between 0° and 250° C. with a mixture of sodium dispersion in an inert organic solvent and 1,4-bis(dimethylamino)-2-butyne and separating a said compound, $R^1$, $R^2$, $R^5$, and $R^6$ taken individually representing hydrocarbon groups, $R^1$ and $R^2$ when taken together and $R^5$ and $R^6$ when taken together representing divalent chains from the class consisting of —CH2CH2OCH2CH2—, —CH2CH2SCH2CH2—
—CH2CH2CH2CH2—, and —CH2CH2CH2CH2CH2— and $R^3$ and $R^4$ representing a member of the class consisting of hydrogen and hydrocarbon groups, alkyl groups of not over 11 carbon atoms, and the phenyl group.

4. A process for preparing compounds of the structure

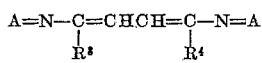

which comprises isomerizing a diaminobutyne of the formula

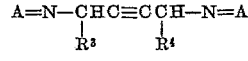

by treating a said diaminobutyne between 0° and 250° C. with a dispersion of sodium metal in an inert organic solvent, A representing a divalent chain from the class consisting of —CH2CH2OCH2CH2—,

—CH2CH2SCH2CH2—, —CH2CH2CH2CH2—, and —CH2CH2CH2CH2CH2—, and $R^3$ and $R^4$ representing a member of the class consisting of hydrogen, alkyl groups of not over 11 carbon atoms, and the phenyl group.

5. A process for preparing compounds of the structure

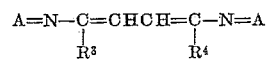

which comprises isomerizing a diaminobutyne of the formula

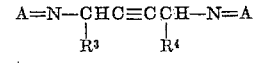

by treating a said diaminobutyne between 0° and 250° C. with a sodium hydrocarbon as catalyst, A representing a divalent chain from the class consisting of —CH2CH2OCH2CH2—, —CH2CH2SCH2CH2—,
—CH2CH2CH2CH2—, and —CH2CH2CH2CH2CH2—, and $R^3$ and $R^4$ representing a member of the class consisting of hydrogen, alkyl groups of not over 11 carbon atoms, and the phenyl group.

6. Compounds of the structure

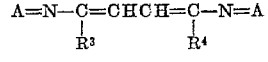

wherein A represents a divalent chain from the class consisting of —CH2CH2OCH2CH2—,

—CH2CH2SCH2CH2—, —CH2CH2CH2CH2— and —CH₂CH₂CH₂CH₂CH₂—, and $R^3$ and $R^4$ representing a member of the class consisting of hydrogen, alkyl groups of not over 11 carbon atoms, and the phenyl group.

7. As a new compound, 1,4-dimorpholino-1,3-butadiene.

8. As a new compound, 1,4-dipiperidino-1,3-butadiene.

9. As a new compound, 1,4-dipyrrolidino-1,3-butadiene.

References Cited in the file of this patent

UNITED STATES PATENTS

| | | |
|---|---|---|
| 2,273,141 | Reppe | Feb. 17, 1942 |
| 2,617,827 | McKeever | Nov. 11, 1952 |

FOREIGN PATENTS

| | | |
|---|---|---|
| 619,206 | Great Britain | 1949 |